(12) United States Patent
Zhong et al.

(10) Patent No.: US 10,235,451 B2
(45) Date of Patent: Mar. 19, 2019

(54) DATA CACHING BASED ON SOCIAL CHARACTERISTICS OF USERS

(71) Applicant: Empire Technology Development LLC, Wilmington, DE (US)

(72) Inventors: Haoqing Zhong, Beijing (CN); Qi Li, Beijing (CN); Xuefeng Song, Hebei (CN)

(73) Assignee: Empire Technology Development LLC, Wilmington, DE (US)

( * ) Notice: Subject to any disclaimer, the term of this patent is extended or adjusted under 35 U.S.C. 154(b) by 848 days.

(21) Appl. No.: 14/421,309

(22) PCT Filed: Dec. 18, 2012

(86) PCT No.: PCT/CN2012/086844
§ 371 (c)(1),
(2) Date: Feb. 12, 2015

(87) PCT Pub. No.: WO2014/094234
PCT Pub. Date: Jun. 26, 2014

(65) Prior Publication Data
US 2015/0220628 A1 Aug. 6, 2015

(51) Int. Cl.
*G06F 17/30* (2006.01)
*H04L 29/08* (2006.01)
*H04L 29/06* (2006.01)

(52) U.S. Cl.
CPC .... *G06F 17/30705* (2013.01); *G06F 17/3048* (2013.01); *G06F 17/30902* (2013.01); *H04L 67/2842* (2013.01); *H04L 67/42* (2013.01)

(58) Field of Classification Search
CPC .......... G06F 17/30705; G06F 17/3048; G06F 17/30902
See application file for complete search history.

(56) References Cited

U.S. PATENT DOCUMENTS

| 6,026,474 | A | 2/2000 | Carter et al. |
| 7,096,418 | B1 | 8/2006 | Singhal et al. |
| 7,730,086 | B1 | 6/2010 | Phoha et al. |
| 8,458,214 | B1 * | 6/2013 | Wilson .............. G06F 17/30312 707/777 |
| 2007/0192299 | A1 * | 8/2007 | Zuckerberg ............ G06Q 10/10 |

(Continued)

FOREIGN PATENT DOCUMENTS

CN 101692229 A 4/2010
CN 102638584 A 8/2012

OTHER PUBLICATIONS

International search report for PCT application No. PCT/CN2012/086844 dated Oct. 10, 2013.

*Primary Examiner* — James Trujillo
*Assistant Examiner* — Aida Z Tessema

(57) ABSTRACT

In one example embodiment, a computer-implemented method is provided for caching data from an online resource based on social characteristics of users using the data. The method includes dividing the users into one or more social groups according to the social characteristics, and creating one or more cache databases corresponding to the one or more social groups, wherein data in each of the one or more cache databases are indexed by one or more user attributes identifying social characteristics of user used the data.

21 Claims, 8 Drawing Sheets

(56) References Cited

U.S. PATENT DOCUMENTS

2009/0204753 A1* 8/2009 Bridge, Jr. ............ G06F 12/122
　　　　　　　　　　　　　　　　　　　　711/106
2010/0205193 A1* 8/2010 Krishna ............ G06F 17/30528
　　　　　　　　　　　　　　　　　　　　707/758
2011/0167171 A1　7/2011 Dunstan

* cited by examiner

DATA CACHING BASED ON SOCIAL CHARACTERISTICS OF USERS

CROSS-REFERENCE TO RELATED APPLICATION

This Application is the U.S. National Stage filing under 35 U.S.C. § 371 of International Application No. PCT/CN2012/086844, filed on Dec. 18, 2012. International Application No. PCT/CN2012/086844 is hereby incorporated herein by reference in its entirety.

TECHNICAL FIELD

The embodiments described herein pertain generally to data caching based on social characteristics of users of the data.

BACKGROUND

Interactive flows of data in the Internet may use web server page caching technologies. Via these technologies, a user's request for a web page may result in a web page cache being accessed before a targeted web server is accessed, and the requested web page is retrieved directly from the web page cache if a copy of the requested web page is stored therein; otherwise, the database for the web server will be queried for the requested web page.

Web page cache functions include cached page storage, cached page replacement, and cached page refreshing. Web server page caching technologies include page caching storage to store web pages that a user has previously accessed, according to the order in which the web pages were accessed using a first-in-first-out approach that replaces the oldest web page in the cache first.

SUMMARY

In at least one embodiment, a method for caching data from an online resource based on social characteristics of users using the data includes dividing the users into one or more social groups according to the social characteristics, and creating one or more cache databases corresponding to the one or more social groups, wherein data in each of the one or more cache databases are indexed by one or more user attributes identifying social characteristics of user used the data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
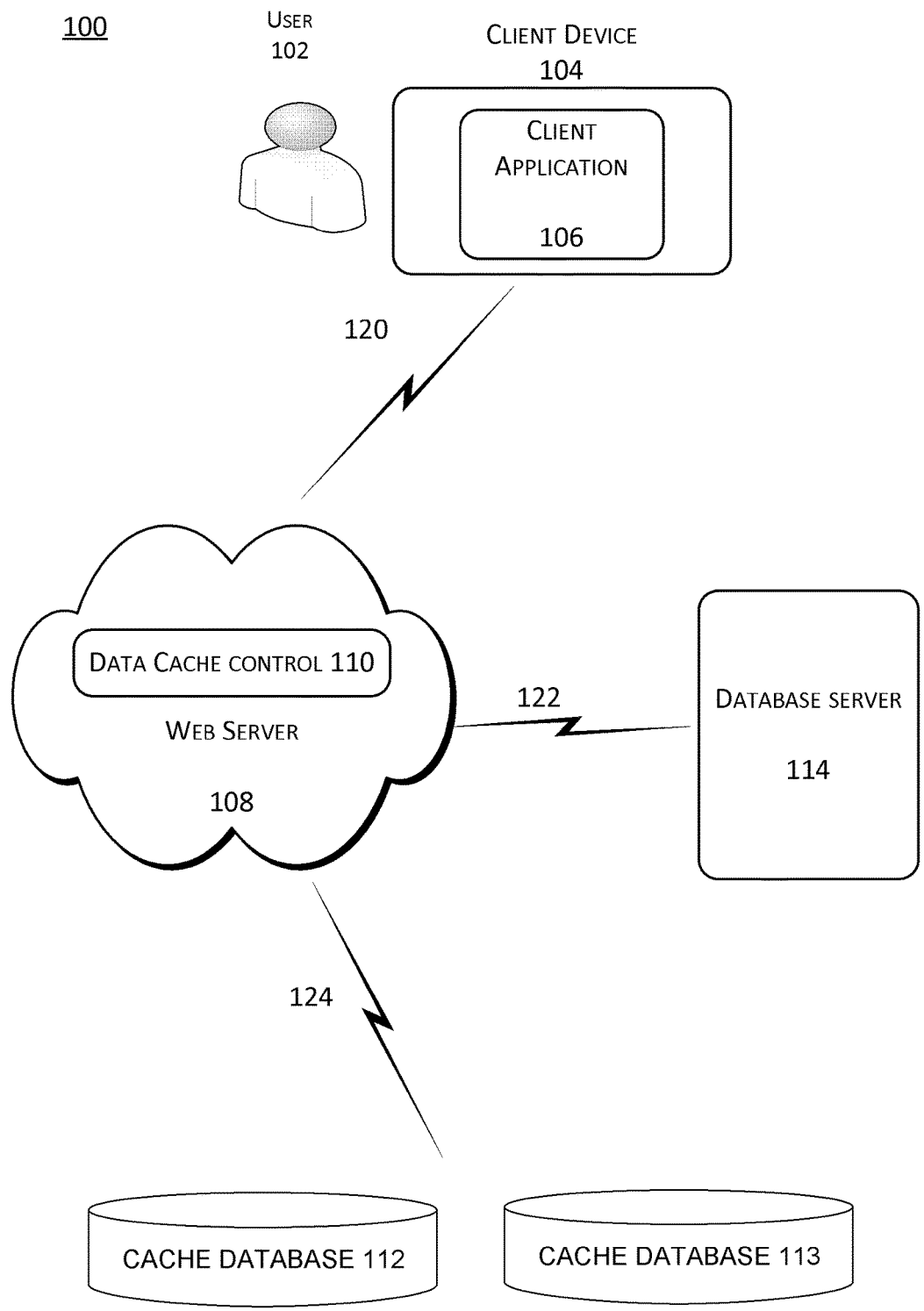
FIG. 1 shows an example system configuration in which data caching based on social characteristics of users may be implemented, arranged in accordance with at least some embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system configuration 100 in which data caching based on social characteristics of users may be implemented, arranged in accordance with at least some embodiments described herein. As depicted, configuration 100 includes, at least, a client device 104 with an instance of a client application 106 hosted thereon, a web server 108 that stores a data cache control 110 thereon, a cache database 112, a cache database 113, and a database server 114. A user 102 may be regarded as a person or entity that exercises ownership or control of client device 104 at a given time.

Client device 104 may refer to a processor-based electronic device on which an instance of client application 106 may be hosted to enable user 102 to request or receive data from web server 108. Further, client device 104 may be configured to transmit data to and receive data from web server 108, via a wireless communication link, by further connecting to a mobile communications network provided by a wireless service provider (not shown). Client device 104 may be implemented as a mobile (or portable) electronic device such as a mobile phone, cell phone, smartphone, personal data assistant (PDA), a personal media player device, an application specific device, or a hybrid device that includes any of the above functions. Client device 104 may also be implemented as a personal computer including tablet, laptop computer, and non-laptop computer configurations, which may be connected to the aforementioned mobile communications network or, alternatively, to a wired network.

The aforementioned wireless service provider for implementing communications for client device 104 may also be known as a mobile network carrier, wireless carrier, or even cellular company. Regardless of the alternate reference, the wireless service provider may provide services for mobile communications subscribers. An instance of client application 106 hosted on client device 104 may enable client device 104 to engage with web server 108. For example, client application 106 may represent a web browser that is configured to facilitate interaction between client device 104, under the control of user 102, and at least web server 108.

Web server 108 may refer to a cloud-based service and storage platform that is owned and/or operated by a third-party service provider. Web server 108 may include a framework of hardware, software, firmware, or any combination thereof, through which or to which digital data and information may be stored, passed, or shared in the context of a data communication for client device 104 under the control of user 102. According to example embodiments of web server 108, client device 104 under the control of user 102 may refer to any subscriber to the service hosted by web server 108.

Data cache control 110 may refer to a program that is configured for implementation by web server 108 to manage requests for data from client device 104 under the control of user 102 as well as requests for data from other client devices under the control of other subscribers to the service hosted by web server 108. Data cache control 110 may include logic implemented by hardware, software, firmware, or any combination thereof. In an example embodiment, data cache control 110 may divide subscribers to the service hosted by web server 108, including user 102, into one or more social groups according to one or more social characteristics attributed to each of the respective subscribers. Such characteristics attributed to user 102 and the other subscribers may be gleaned from profile information that is registered with the service hosted by web server 108 upon registering for the service or that is provided at some other time during use of the service.

Data cache control 110 may exercise control over cache database 112 and cache database 113 on behalf of web server 108, with cache database 112 and cache database 113 each corresponding to a different one of the aforementioned social groups. Thus, in accordance with at least one example, upon receiving a request for data, e.g., from client application 106 on client device 104 under the control of user 102, data cache control 110 may analyze one or more user attributes accompanying the request for data and determine to which one or more of the social groups user 102 belongs. Accordingly, data cache control 110 may determine to which one of cache database 112 and cache database 113 the request for data is to be directed.

Cache database 112 and cache database 113 may serve as examples of databases configured to cache at least a portion of the data requested from web server 108 by user 102 or any other subscriber to the service hosted thereby. System configuration 100, as depicted, is an example that is not intended to be limiting in any manner, including the quantities of cache databases. That is, system configuration may include multiple cache databases that are well beyond, in quantity, cache database 112 and cache database 113, and which may reside on web server 108 or even on client device 104. Thus, reference may be made herein to "cache database 112, cache database 113, etc.," to make clear the lack of constraints on the quantity of cache databases in configuration 100. As disclosed above, system configuration 100 may include cache database 112 and cache database 113, each corresponding to a different one of the aforementioned social groups.

Although the embodiments described herein contemplate each of cache database 112, cache database 113, etc., corresponding to one social group to which user 102 may be assigned, such example embodiments are not intended to be limiting. That is, any one or more of cache database 112, cache database 113, etc., may be configured to searched for data based on attributes corresponding to more than one social group. Further, as described further herein, at least one example may contemplate system 100 not including any cache database for a social group to which user 102 is attributed.

Database server 114, in accordance with at least one example, may refer to a database configured to host data that is to be accessed by web server 108. That is, web server 108 may query database server 114 for the data requested by client device 104 under the control of user 102 when it has been determined that neither cache database 112 nor cache database 113 correspond to the social group to which user 102 is identified or attributed. Alternatively, web server 108 may query database server 114 for the requested data when the cache database that is identified as corresponding to the social group, to which user 102 is identified or attributed, does not store the requested data therein.

Communication link 120 may refer to a communication link that is enabled by a protocol utilized to transmit data and/or information between client application 106, via client device 104, and web server 108.

Communication link 122 may refer to a communication link that is enabled by a protocol utilized to transmit data and/or information between web server 108 and database server 114.

Communication link 124 may refer to a communication link that is enabled by a protocol utilized to transmit data and/or information pertaining to a transaction between web server 108 and cache database 112, cache database 113, etc.

The aforementioned protocols referring to communication links 120, 122, and 124 may include any mobile communications technology, e.g., GSM (Global System for Mobile Communications), CDMA (Code Division Multiple Access), etc., depending upon the technologies supported by particular wireless service providers to whose services client device 104, web server 108, cache database 112, cache database 113, etc., and/or database server 114 may be assigned or subscribed. Further, one or more of the aforementioned communication links 120, 122, and 124 may be implemented utilizing non-cellular technologies such as conventional analog AM or FM radio, Wi-Fi™, wireless local area network (WLAN or IEEE (Institute of Electrical and Electronics Engineers) 802.11), WiMAX™ (Worldwide Interoperability for Microwave Access), Bluetooth™, hard-wired connections, e.g., cable, phone lines, and other analog and digital wireless voice and data transmission technologies.

Thus, FIG. 1 shows an example implementation of a system configuration 100 for implementing data caching based on social characteristics of users.

Figure 2:
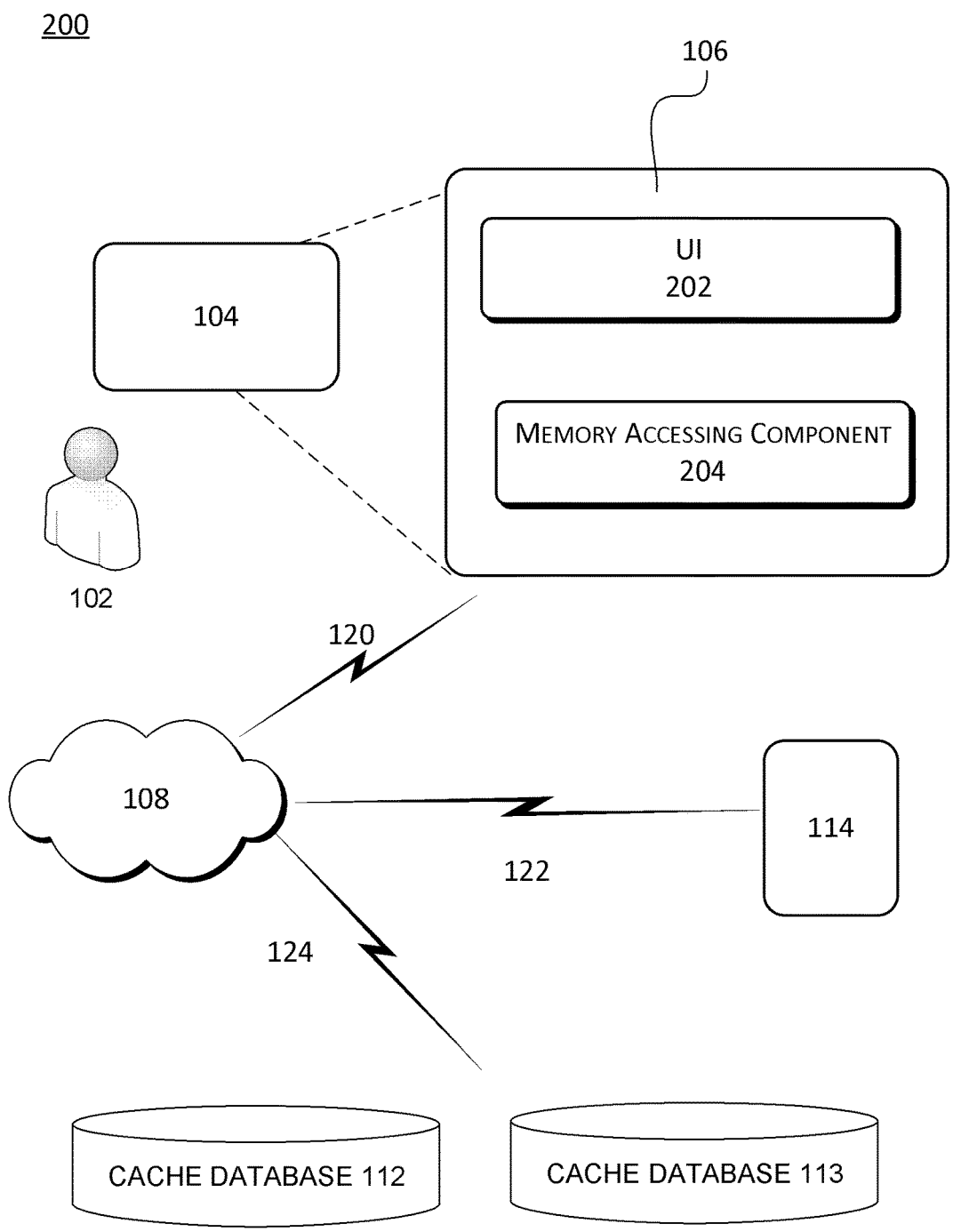
FIG. 2 shows an example configuration of a client application by which at least portions of data caching based on social characteristics of users may be implemented, arranged in accordance with at least some embodiments described herein.

FIG. 2 shows an example configuration 200 of a client application by which at least portions of data caching based on social characteristics of users may be implemented, arranged in accordance with at least some embodiments described herein. As depicted, client application 106, hosted on client device 104, may include a user interface (UI) 202 and a memory accessing component 204. In FIG. 2, client device 104 is depicted relative to web server 108, cache database 112, cache database 113, etc., and database server 114, as in FIG. 1, along with the respective communication links relative to client device 104; however, this configuration is an example only, and is not intended to be limiting in any manner. At least some embodiments of data caching based on social characteristics of users may contemplate client application 106 representing a web browser that is configured to facilitate user interaction with at least web server 108, database server 114, and/or one or of cache database 112, cache database 113, etc.

Whereas the present description of client application 106 makes reference to client device 104, on which client application 106 may be hosted, it is to be understood that the corresponding embodiment, or modified version thereof, may be similarly applicable to web server 108, cache database 112, cache database 113, etc., and database server 114, on which another instance of client application 106 or modified version thereof may be hosted.

UI 202 may refer to a graphical component or module of client application 106 that is configured, designed, and/or programmed to facilitate interaction between user 102 and a web browser on client device 104. In at least one example, UI 202 may enable user interaction with web server 108. UI 202 may be configured, designed, and/or programmed as a software module that is hosted, at least in part, on a memory of client device 104.

Memory accessing component 204 may refer to a component or module that is configured, designed, and/or programmed to access a storage or database hosted on client device 104 or web server 108. On client device 104, memory accessing component 204 may be configured, designed, and/or programmed to receive and store data received from web server 108.

Thus, FIG. 2 shows an example configuration 200 including an example implementation of client application 106 by which one or more embodiments of data caching based on social characteristics of users may be implemented.

Figure 3:
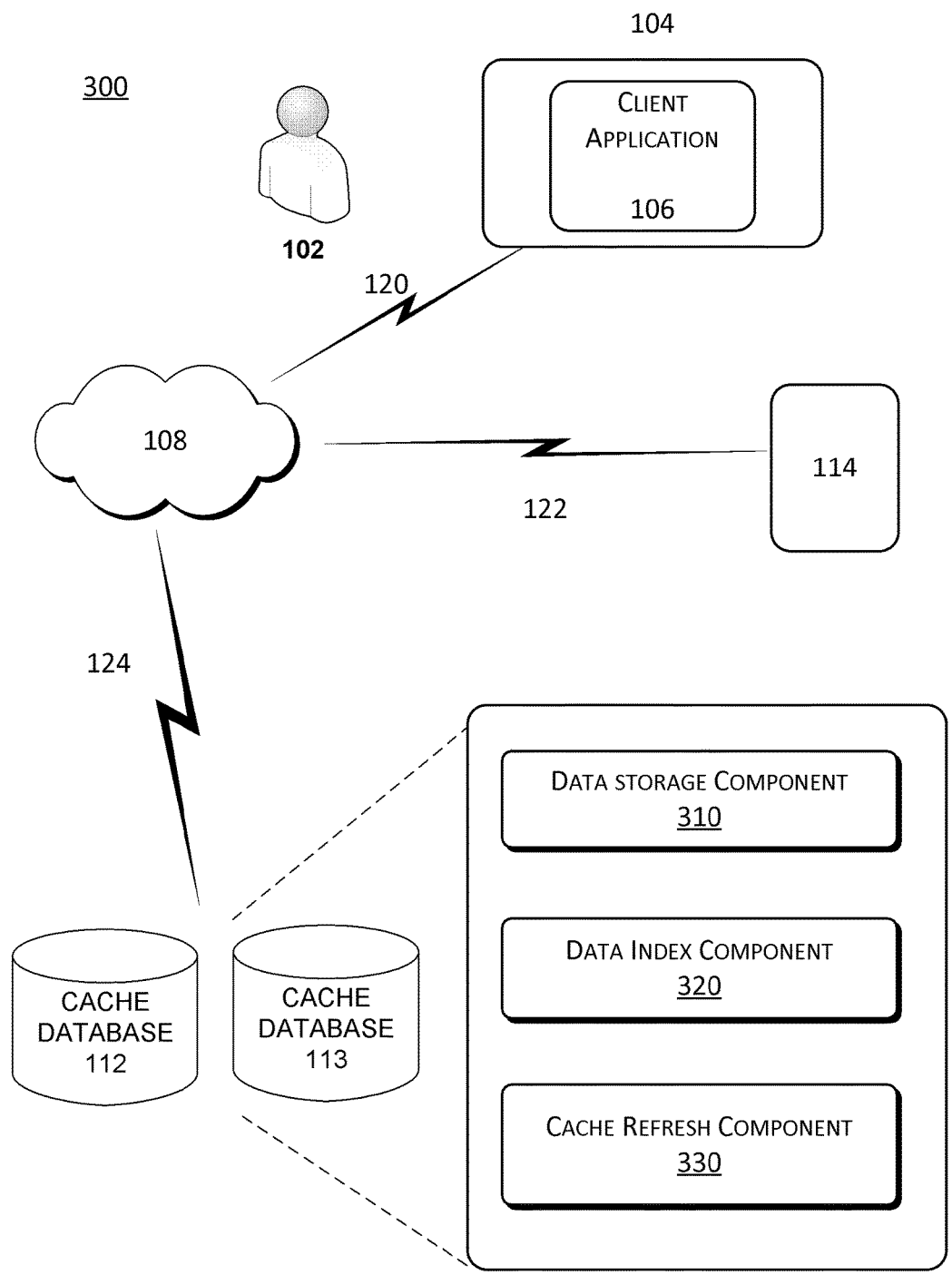
FIG. 3 shows an example configuration of cache databases by which at least portions of data caching based on social characteristics of users may be implemented, arranged in accordance with at least some embodiments described herein.

FIG. 3 shows an example configuration 300 for cache databases by which at least portions of data caching based on social characteristics of users may be implemented, arranged in accordance with at least some embodiments described herein. One or more cache databases, including cache database 112, cache database 113, etc., may be hosted on web server 108 or client device 104, though only cache database 112 and cache database 113 are presently shown. Further, each of cache database 112, cache database 113, etc., may store data used by a respective one of the aforementioned social groups to which user 102 is identified or attributed. Thus, data content stored in cache database 112, cache database 113, etc., may be different from each other since each cache database stores data corresponding to a particular social group. Further still, each of cache database 112, cache database 113, etc., may include, at least, a data storage component 310, a data index component 320, and a cache refresh component 330. In FIG. 3, cache database 112 and cache database 113 are both depicted relative to client application 106 hosted on client device 104, web server 108, and database server 114, as in FIG. 1; however, this configuration is an example only, and is not intended to be limiting in any manner.

Data storage component 310 may refer to a component or module that is configured, designed, and/or programmed to store and replace data in a respective one of cache database 112, cache database 113, etc. Data storage component 310 may be configured, designed, and/or programmed to be executed by one or more processors on the device on which the respective cache database is hosted, e.g., on web server 108. In an example embodiment, the data stored in cache database 112 may include web pages requested by client device 104 under the control of user 102, corresponding to a social group to which user 102 is identified or attributed.

Data storage component 310 may include an access counter (not shown) that tracks the number of requests for each respective web page stored in the respective cache databases. Thus, storage of particular web pages in anyone of cache database 112, cache database 113, etc., may be based on a number of requests received for the respective web page. Accordingly, web pages for which the most access requests have been received may be stored in a most readily accessible location of the respective cache database to thereby facilitate quicker access thereof. In an example embodiment pertaining to cache database 112, the web page for which the least number of access requests have been received may be first to be replaced by a new web page stored into cache database 112.

Data index component 320 may refer to a component or module of cache database 112, cache database 113, etc., that is configured, designed, and/or programmed to index data stored in a respective cache database. As set forth above, the stored data may include, for example, web pages. Data index component 320 may be configured, designed, and/or programmed to be executed by one or more processors on the device on which the respective cache database is hosted, e.g., on web server 108. Data index component 320 may index the stored data using the user attributes associated with the data when a first request for the data is received from client device 104 under the control of user 102. In an example embodiment, client device 104 under the control of user 102 may request a web page represented by Uniform Resource Locator URLn. Social characteristics of user 102 may be identified through user attributes, which may accompany the request in the form of metadata. Data storage component 310 may store the requested data represented by, e.g., the Uniform Resource Locator URLn in the respective cache database. Data index component 320 then may index the requested data using the accompanying user attributes. With such an indexing structure, subsequent queries of the respective cache database for the requested data represented by URLn may be executed more efficiently by first searching for the user attributes, and then for URLn.

Cache refresh component 330 may refer to a component or module of cache database 112, cache database 113, etc., that is configured, designed, and/or programmed to periodically refresh the respective cache database. Cache refresh component 330 may be configured, designed, and/or programmed to be executed by one or more processors on the device that the respective cache database is hosted, e.g., web server 108. Cache refresh component 330 may refresh the respective cache database to thereby obtain, from database server 114, a most recent version of the data stored. A refresh rate implemented by cache refresh component 330 may be a frequency that is inversely proportional to a volume of access requests that the respective cache database receives.

That is, when the volume of access requests received by a respective cache database increases, cache refresh component 330 may reduce the frequency of refreshing the respective cache database so as to reduce a burden of cache refreshment on the network. In one example embodiment, cache refresh component 330 may set a threshold value for network traffic flow. Thus, when the network traffic flow exceeds the threshold, cache refresh component 330 may reduce the frequency of the cache refreshing; but when the network traffic flow is below the threshold, cache refresh component 330 may raise the frequency of cache refreshing for the respective cache database.

Thus, FIG. 3 shows an example configuration 300 including one example implementation of cache database 112, cache database 113, etc., by which one or more embodiments of data caching based on social characteristics of users may be implemented.

Figure 4A:
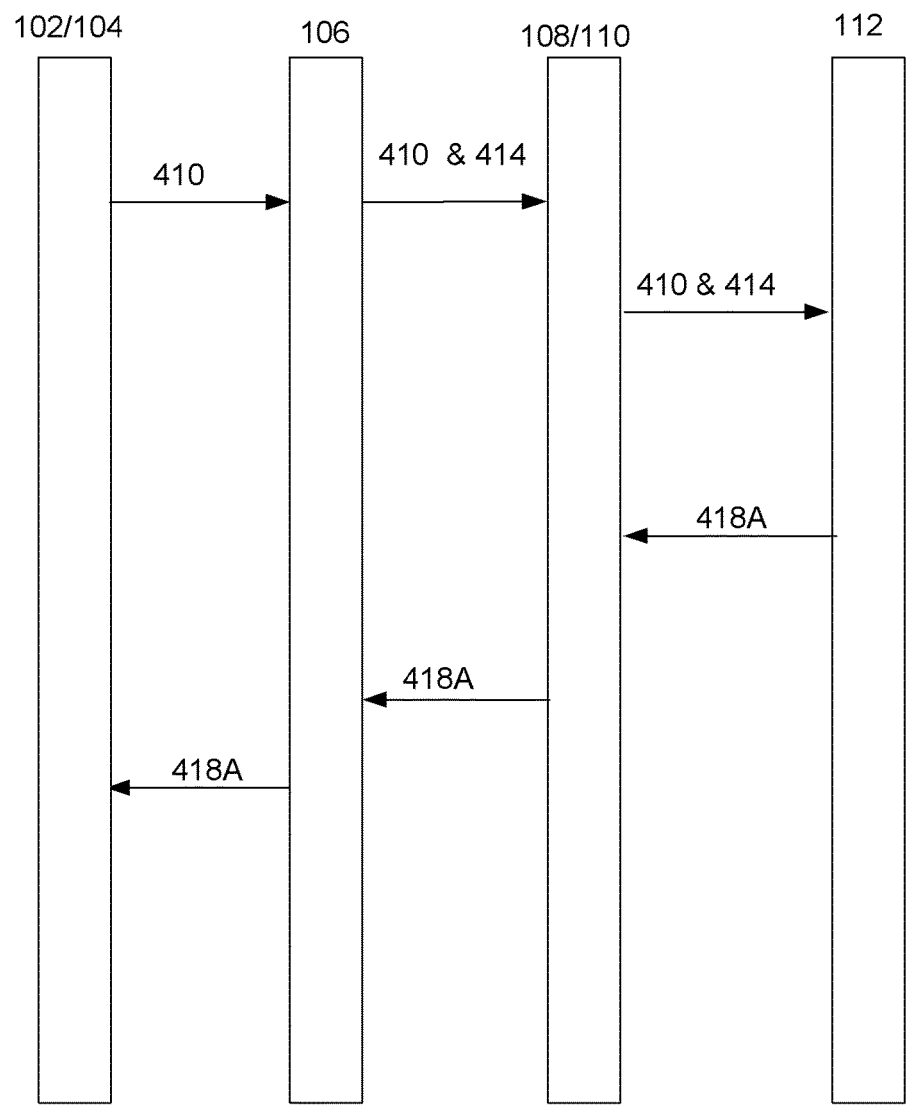
FIG. 4A and FIG. 4B show an example communication flow of operation for data caching based on social characteristics of users, implemented by at least some embodiments described herein.
Figure 4B:
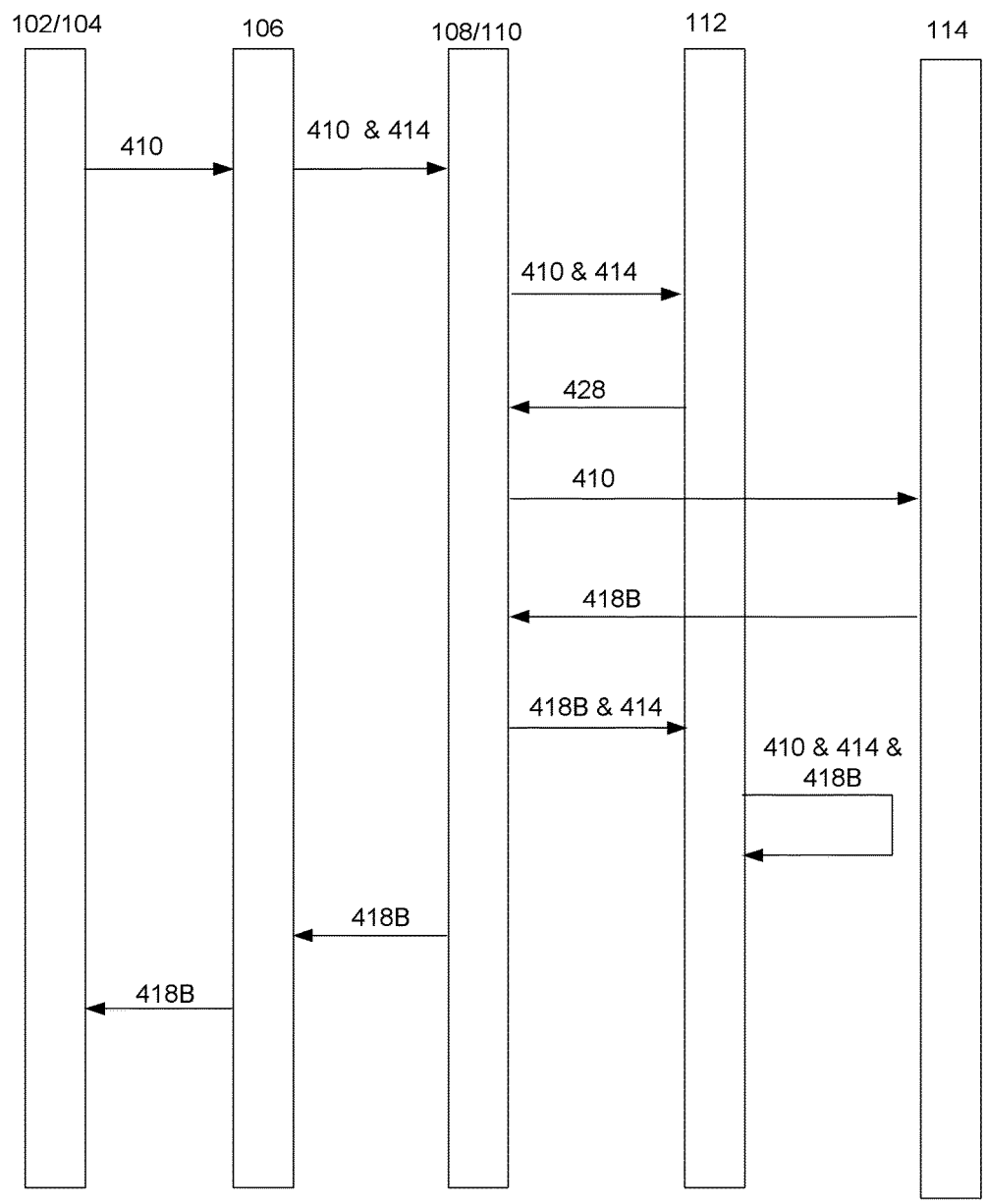

FIG. 4A and FIG. 4B show an example communication flow of operation 400 for data caching based on social characteristics of users, implemented by at least some embodiments described herein. FIG. 4A illustrates an example communication flow 400 when cache database 112 stores data requested by client device 104 under control by user 102. FIG. 4B illustrates an example communication flow 400 when the data requested by client device 104 under control by user 102 is not stored in cache database 112 or, alternatively, in any other cache database assigned to a particular social group to which user 102 is identified or attributed. As depicted, communication flow 400 may be regarded as a data retrieval process. Communication flow 400 may include communications issued by various components included in system configuration 100 illustrated in FIG. 1. For example, communication flow 400 includes transmission between and amongst client device 104, web server 108, cache database 112, and database server 114. However, communication flow 400 is not limited to such components, as obvious modifications may be made by re-ordering two or more of the communications described here, eliminating at least one of the communications, adding further communications, substituting components, or even having various components assuming communications accorded to other components in the following description. For example, communication flow relates to cache database 112. However, implementation of the example communication flow is not limited to the inclusion of only cache database 112 or even the exclusion of cache database 113 or any other non-depicted cache database. For example, although the embodiments described herein contemplate each of cache database 112, cache database 113, etc., corresponding to one social group to which user 102 may be assigned, any one or more of cache database 112, cache database 113, etc., may be configured to searched for data based on attributes corresponding to more than one social group. That is, one or more of cache database 112, cache database 113, etc., may store data for more than one social group in accordance with the embodiments described herein.

As depicted in both FIG. 4A and FIG. 4B, communication flow 400 may start with client device 104 under the control of user 102 transmitting a request for data 410, from client application 106, e.g., via user 102 submitting the request on UI 202 of client application 106 to web server 108. Client application 106 may forward one or more user attributes 414 that identify social characteristics of user 102, along with the request for data 410, to web server 108. User attributes 414 may identify one or more of the social group to which user 102 is identified or attributed. Some of user attributes 414 may be static, i.e., unchangeable, such as the name of user 102, while some of the user attributes may be dynamic, i.e., variable, such as an occupation of user 102.

Data cache control 110 on web server 108 may analyze the received request for data 410, which may be accompanied by user attributes 414. The analysis may include identifying which of the one or more social groups that user 102 may belong based on the received user attributes 414. By such analysis, data cache control 110 may identify the appropriate one of cache database 112, cache database 113, etc., that hosts data for the social group to which user 102 is identified or attributed. Web server 108 may then query the identified cache database, e.g., cache database 112, for the requested data by transmitting thereto the request for data 410 and the accompanying user attributes 414.

As depicted in FIG. 4A, when queried cache database 112 stores the requested data, cache database 112 may transmit requested data 418A to web server 108. Web server 108, in turn, may relay requested data 418A to client application 106, which may communicate requested data 418A to user 102, e.g., by displaying requested data 418A on UI 202 of client application 106.

As depicted in FIG. 4B, when queried cache database 112 does not store requested data 418, cache database 112 may indicate so, e.g., by transmitting a "miss" message 428 to web server 108. Upon receiving "miss" message 428, data cache control 110 may query database server 114 for requested data 418, e.g., by transmitting request for data 410 to database server 114. Database server 114 may respond by transmitting requested data 418B to web server 108. Web server 108 may then transmit requested data 418B to queried cache database 112. Cache database 112 may store requested data 418B, along with request for data 410, and index requested data 418B with user attributes 414. Meanwhile, web server 108 may transmit requested data 418B to client application 106, which may communicate requested data 418B to user 102, e.g., by displaying requested data 418B on UI 202 of client application 106.

Thus, FIG. 4A and FIG. 4B show an example communication diagram 400 in reference to FIG. 1, by which one or more embodiments of data caching based on social characteristics of users may be implemented.

Figure 5:
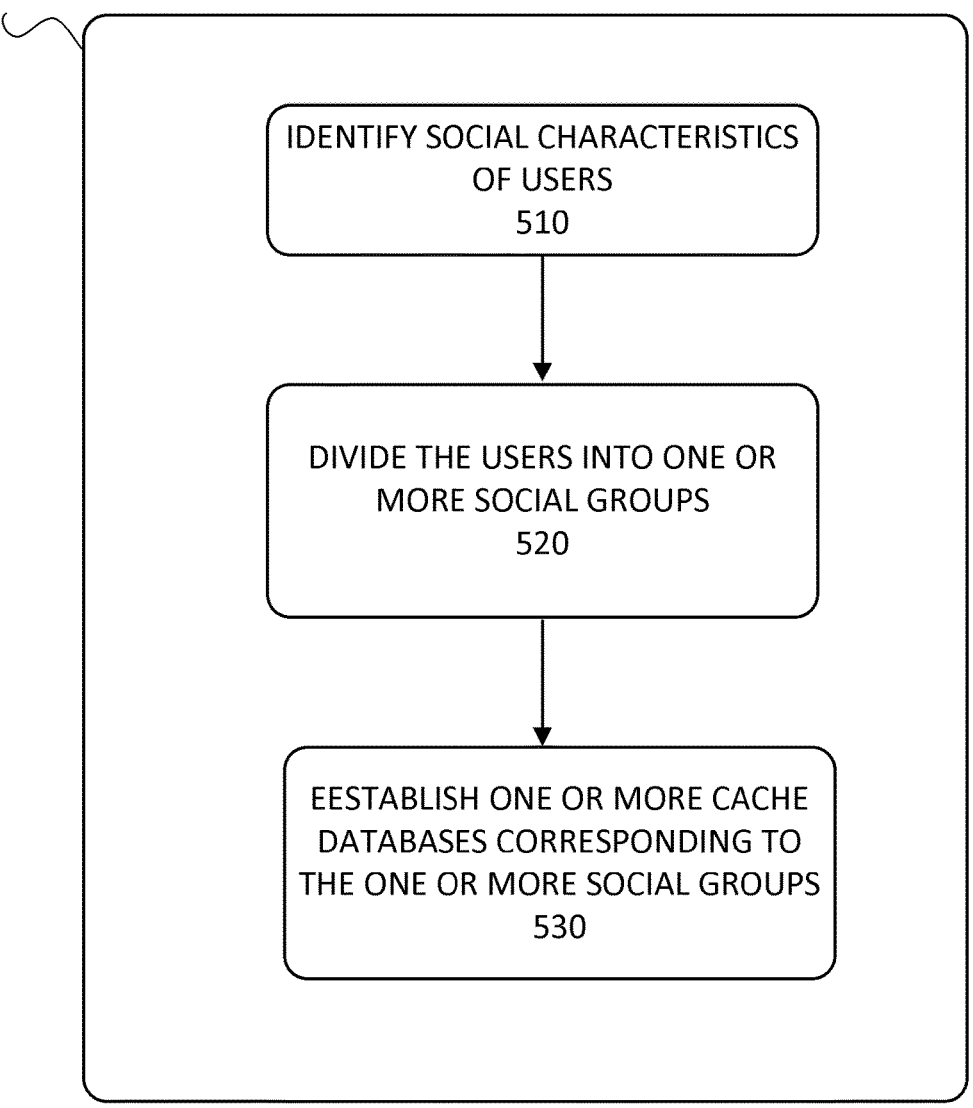
FIG. 5 shows an example processing flow of operations for data caching based on social characteristics of users, in accordance with at least some embodiments described herein.

FIG. 5 shows an example processing flow 500 of operations for data caching based on social characteristics of users, arranged in accordance with at least some embodiments described herein. As depicted, processing flow 500 may include sub-processes executed by various components that are part of data cache control 110 hosted on web server 108. However, implementation of processing flow 500 is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description. Processing flow 500 may include various operations, functions, or actions as illustrated by one or more of blocks 510, 520, and/or 530. Processing flow 500 may begin at block 510.

Block 510 (Identify Social Characteristics of Users) may refer to data cache control 110 utilizing information to identify social characteristics of users, who are subscribers to the services hosted by web server 108. The social characteristics may be identified via user attributes that are associated with each user that requests access to data from web server 108 and that are provided during, e.g., user registration for the respective services. Data cache control 110 may include logic implemented by hardware, software, firmware, or any combination thereof, to appropriately address one or more data requests from client device 104 under the control of user 102. Processing flow 500 may continue from block 510 to block 520.

Block 520 (Divide the Users Into One or More Social Groups) may refer to data cache control 110 dividing, separating users who subscribe to services hosted by web server 108 into one or more social groups according to the social characteristics attributed to the respective users. The dividing of the users into the respective social groups may include the users being categorized, separated, identified, attributed into one or more social groups based one or more criteria. For example, the social groups may include, e.g., social group for computer scientists, social group for lawyers, social group for mothers, etc. That is, non-limiting examples of basis for defining such social groups may include interests and occupations. Continuing with the non-limiting examples, users with a computer science background may be assigned to a corresponding social group, e.g., "CS group;" users with legal training may be assigned to another corresponding social group, e.g., "Lawyers group;" and female users who have young children may be assigned to yet another corresponding social group, e.g., "Mothers." Processing flow 500 may continue from block 520 to block 530.

Block 530 (Establish One or More Cache Databases Corresponding to the One or More Social Groups) may refer to data cache control 110 establishing cache database 112, cache database 113, etc., corresponding to the one or more social groups established in block 520. For example, cache database 112 may be established for users assigned to the CS group, cache database 113 may be established for users assigned to the Lawyers group, and yet another cache database (not shown) may be established for the Mothers group. According to a non-limiting example, since users in the CS group may be more likely to access computer-related data, users in the Lawyers group may be more likely to access law-related data, and users in the Mothers group may be more likely to access data related to parenting, the corresponding cache database for these social groups may likely gather and store computer-related data, law-related data, and parenting-related data. This approach to data caching based on social characteristics of users of the data may increase hit rates of these cache databases and hence improve access speed to the data for users requesting access to the data.

Thus, FIG. 5 shows an example processing flow 500 executed by data cache control 110 hosted by web server 108 for implementing at least portions of data caching based on social characteristics of users.

Figure 6:
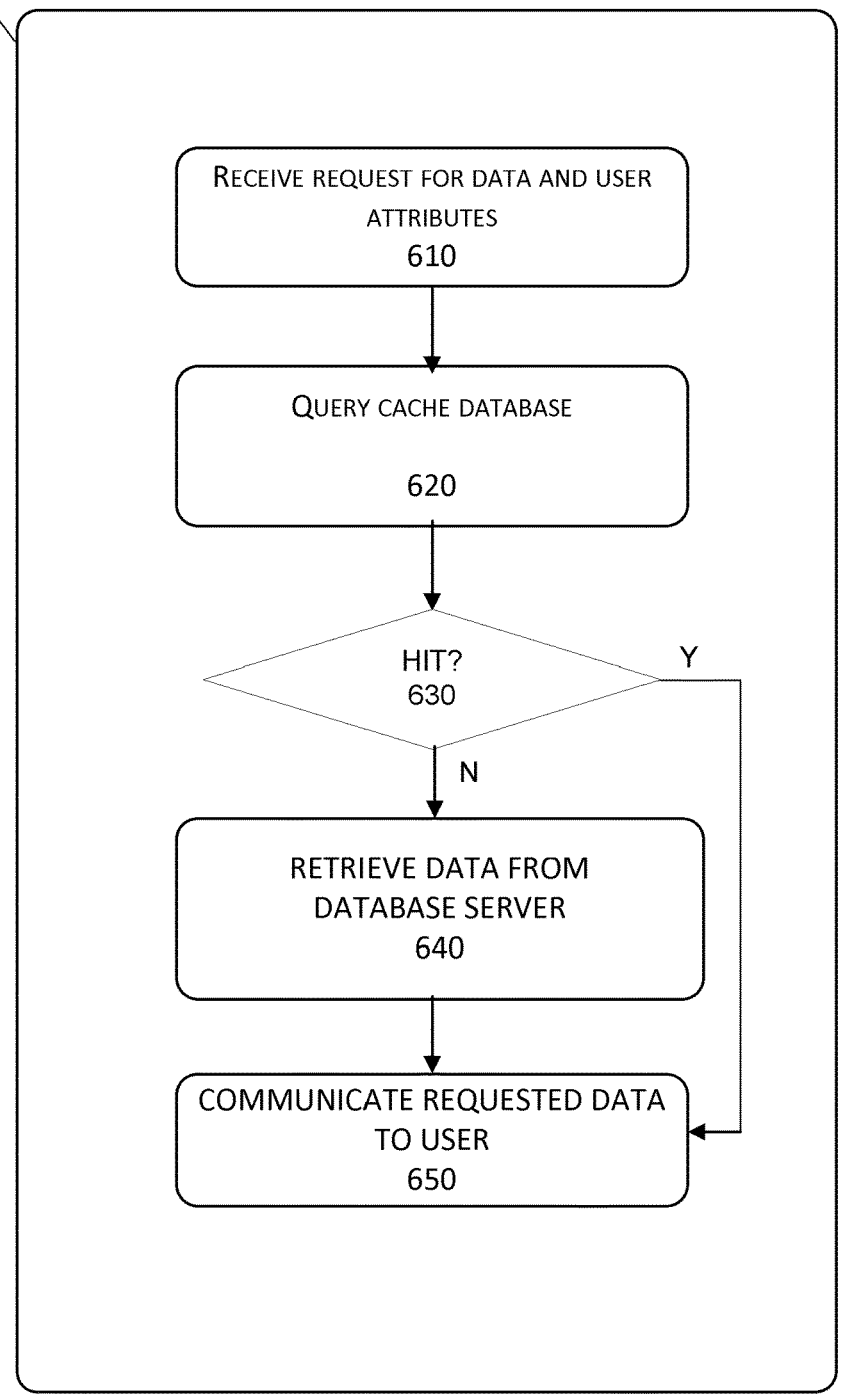
FIG. 6 shows an example processing flow of additional operations for data caching based on social characteristics of users, in accordance with at least some embodiments described herein.

FIG. 6 shows an example processing flow 600 of additional operations for data caching based on social characteristics of users implemented by a web server, arranged in accordance with at least some embodiments described herein. As depicted, processing flow 600 may include sub-processes executed by various components that are part of data cache control 110 hosted on web server 108. However, implementation of processing flow 600 is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description. Processing flow 600 may include various operations, functions, or actions as illustrated by one or more of blocks 610, 620, 630, 640 and/or 650. Processing flow 600 may begin at block 610.

Block 610 (Receive Requests for Data and User Attributes) may refer to data cache control 110 receiving, via web server 108, a request for data that is accompanied by one or more user attributes that identify social characteristics of user 102 who is requesting data, via client application 106 on client device 104. Data cache control 110 may assign one or more users with such user attributes to a social group, and create a corresponding cache database for that social group if such a cache database does not already exist. Therefore, upon receiving the request for data from client device 104 under the control of user 102, data cache control 110 on web server 108 may identify the appropriate one of cache database 112, cache database 113, etc., using the received user attributes. The description of processing flow 600 may, therefore, include reference to "appropriately identified cache database." Processing flow 600 may continue from block 610 to block 620.

Block 620 (Query Cache Database) may refer to data cache control 110 querying the appropriately identified cache database for the requested data. In at least one example embodiment, data cache control 110 may transmit the request for data to the appropriately identified cache database, along with the one or more user attributes that accompany the request for data. Data in all of cache database 112, cache database 113, etc., may be indexed by attributes of the user who initially requested access to the data. Therefore, transmitting the user attributes associated with the current request for data to the appropriately identified cache database may enable such cache database to locate the requested data as the user attributes may have been used to index the data in the cache database. Processing flow 600 may continue from block 620 to decision block 630, at which data cache control 110 waits to learn whether the appropriately identified cache database stores the requested data.

At decision block 630 (Hit?), when the appropriately identified cache database does not store the requested data therein, processing flow 600 may continue from decision block 630 to block 640.

Block 640 (Retrieve Data from Database Server) may refer to data cache control 110 querying database server 114 for the requested data. Upon receiving the requested data from database server 114, data cache control 110 may proceed to store the requested data in the appropriately identified cache database. The stored data may be indexed with the one or more user attributes that have come with the request for the data, as this request may be the first request for the data. Processing flow 600 may continue from block 640 to block 650.

At decision block 630 (Hit?), when the appropriately identified cache database stores the requested data stored therein, processing flow 600 may continue from decision block 630 to block 650.

Block 650 (Communicate Requested Data to User) may refer to data cache control 110 transmitting the requested data that is obtained either from the appropriately identified cache database or from database server 114 to the client device 104 under the control of user 102 who has requested the data, e.g., via client application 106 on client device 104. In one or more example embodiments, data cache control 110 or web server 108 may modify the requested data, e.g., presenting the data in the form of a web page if user 102 expects a web page, and transmit user 102 the modified data.

Thus, FIG. 6 shows an example processing flow 600 executed by data cache control 110 hosted on web server 108 for implementing data caching based on social characteristics of users.

Figure 7:
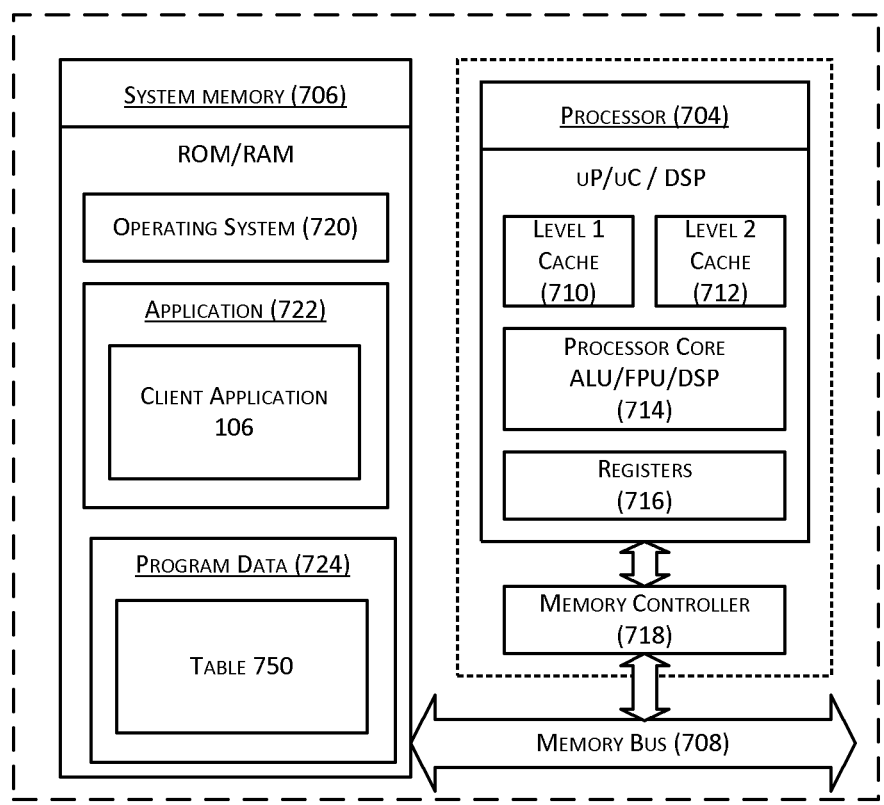
FIG. 7 shows a block diagram illustrating an example computing device by which various example solutions described herein may be implemented, arranged in accordance with at least some embodiments described herein.

FIG. 7 shows a block diagram illustrating an example computing device 700 by which various example solutions described herein may be implemented, arranged in accordance with at least some embodiments described herein.

More particularly, FIG. 7 shows an illustrative computing embodiment, in which any of the processes and sub-processes described herein may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to the configuration 100 for data caching based on social characteristics of users.

In a very basic configuration, a computing device 700 may typically include one or more processors 704 and a system memory 706. A memory bus 708 may be used for communicating between processor 704 and system memory 706.

Depending on the desired configuration, processor 704 may be of any type including but not limited to a microprocessor (µP) a microcontroller (µC), a digital signal processor (DSP), or any combination thereof. Processor 704 may include one or more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724.

Application 722 may be configured to transmit or receive requests for data or data pertaining to user 102 or web server 108 as described previously with respect to FIGS. 1-6. Program data 724 may include a table 750, which may be useful for implementing actuation of appropriate components or modules as described herein.

System memory 706 is an example of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method to cache data from an online resource based on social characteristics of users, the method comprising:
dividing the users into one or more social groups according to the social characteristics of the users;
creating one or more cache databases corresponding to the one or more social groups,
wherein each of the one or more cache databases stores data that is indexed by one or more user attributes of one or more users who initially requested access to the stored data;
receiving, from a user, a request for data, wherein the requested data comprises at least a portion of the stored data, wherein the request is accompanied by at least one user attribute of the user, and wherein the at least one user attribute identifies social characteristics of the user;
identifying, based on the received at least one user attribute, a social group, of the one or more social groups, corresponding to the user, wherein the at least one user attribute is associated with the social group corresponding to the user;
identifying a cache database, of the one or more cache databases, which corresponds to the identified social group;

querying the identified cache database for the requested data, wherein:
  querying the identified cache database includes transmitting the request and the accompanying at least one user attribute to the identified cache database,
  the at least one user attribute is used to search for the requested data in the identified cache database, and
  the use of the at least one user attribute to search for the requested data in the identified cache database, in which the stored data is indexed by the one or more user attributes of the one or more users who initially requested access to the stored data, improves efficiency of the search for the requested data, and increases a speed of access to the requested data for the user;
obtaining the requested data from the identified cache database; and
transmitting the requested data, obtained from the identified cache database, to the user.

2. A method to cache data, the method comprising:
receiving a request for data from a user, wherein the request is accompanied by one or more user attributes that identify social characteristics of the user;
identifying, based on the one or more user attributes, a social group, of a plurality of social groups, of the user, wherein the one or more user attributes correspond to the social group of the user;
identifying a cache database, of a plurality of cache databases, which corresponds to the identified social group of the user, wherein the identified cache database stores data associated with a plurality of users of the social group;
querying the identified cache database for the requested data; and
in response to receiving a message that indicates that the requested data is not stored in the cache database:
querying a database server for the requested data,
receiving the requested data from the database server,
attaching the one or more user attributes with the requested data,
storing, in the identified cache database corresponding to the identified social group of the user, the requested data attached with the one or more user attributes, wherein storing the requested data attached with the one or more user attributes includes indexing the requested data by the one or more user attributes of one or more users who requested access to the stored data, and wherein indexing the requested data by the one or more attributes improves accessibility and a speed of access to the requested data for other users who belong to a same social group as the user and who subsequently request for the data requested by the user; and
transmitting the requested data, received from the database server, to the user.

3. The method of claim 2, wherein storing the requested data comprises:
associating the requested data with a count of accesses of the requested data by the other users from the same social group as the user.

4. The method of claim 3, wherein the requested data is ranked in the identified cache database by a value of the count of accesses of the requested data.

5. The method of claim 4, wherein data with a smallest count value in the identified cache database is replaced first.

6. The method of claim 2, wherein querying the identified cache database comprises searching for the requested data in the cache database according to the one or more user attributes that accompanied the request.

7. The method of claim 2, wherein data in the identified cache database is refreshed at a refresh frequency that is based on a volume of queries that the identified cache database receives.

8. The method of claim 7, wherein:
a threshold is set for the volume of queries that the identified cache database receives,
the refresh frequency decreases when the volume of queries that the identified cache database receives exceeds the threshold, and
the refresh frequency increases when the volume of queries that the identified cache database receives is below the threshold.

9. The method of claim 2, wherein the one or more user attributes of the one or more users are static.

10. The method of claim 2, wherein the one or more user attributes of the one or more users are dynamic.

11. A system to retrieve data, the system comprising:
a database server that is configured to store the data; one or more cache databases, wherein:
  the one or more cache databases area associated with respective one or more social groups of users,
  each of the one or more cache databases is configured to cache data corresponding to the associated social group of users;
  at least one cache database of the one or more cache databases is configured to index the cached data by one or more attributes of a user that belongs to a social group of users associated with the at least one cache database, and that initially requested access to the cached data, and
  the association of the one or more cache databases with the respective one or more social groups of users increases a hit rate of requests for the cached data, and increases a speed of access to data requested by users; and
a web server that is configured to:
receive, from a user, a request for data, wherein the request is accompanied by at least one user attribute of the user, and wherein the at least one user attribute identifies social characteristics of the user;
identify a cache database, of the one or more cache databases, in which at least some of the data cached therein is tagged with the at least one user attribute that accompanied the request for data;
query the identified database for the requested data;
in response to the identified cache database being queried:
  receive the requested data from the identified cache database; or
  receive a message which indicates that the requested data is not cached in the identified cache database; and
in response to receipt of the requested data from the identified cache database, transmit the requested data to the user.

12. The system of claim 11, wherein in response to receipt of the message which indicates that the requested data is not cached in the identified cache database, the web server is further configured to:
query the database server for the requested data;
receive the requested data from the database server;
attach the at least one user attribute that accompanied the request to the requested data; and cache the requested data in the identified cache database in which some of the data cached therein is tagged with the at least one user attribute of the user.

13. The system of claim 11, wherein at least some portions of the data cached in the one or more cache databases are refreshed at a refresh frequency that increases and decreases in accordance with a volume of queries received at the respective cache database.

14. The system of claim 13, wherein:
a threshold is set for the volume of queries,
the refresh frequency decreases when the volume of queries exceeds the threshold, and
the refresh frequency increases when the volume of queries falls below the threshold.

15. The system of claim 11, wherein at least some portions of the data cached in the one or more cache databases are further associated with a count of accesses.

16. The system of claim 15, wherein replacement of the at least some portions of the data starts with portions of data having a lowest count of accesses.

17. The system of claim 11, wherein the at least one user attribute of the user is static.

18. The system of claim 11, wherein the at least one user attribute of the user is dynamic.

19. The method of claim 1, wherein the one or more user attributes are static.

20. The method of claim 1, wherein the one or more user attributes are dynamic.

21. The method of claim 1, further comprising:
obtaining profile information of the users to determine the social characteristics of the users, wherein the profile information is provided by the users while registering for a service associated with the online resource.

* * * * *